UNITED STATES PATENT OFFICE.

ERNST HOENNICKE, OF DRESDEN, GERMANY.

PROCESS FOR OBTAINING THE INNER SECRETIONS OF THE THYROID GLANDS AND OTHER ORGANS IN A PURE STATE.

1,043,007. Specification of Letters Patent. Patented Oct. 29, 1912.

No Drawing. Application filed December 13, 1907. Serial No. 406,292.

*To all whom it may concern:*

Be it known that I, ERNST HOENNICKE, a citizen of the German Empire, and residing at Dresden—A., Kingdom of Saxony, German Empire, have invented a new and useful Process for Obtaining the Inner Secretions of the Thyroid Glands and other Organs in a Pure State, of which the following is a full, clear, and exact description.

In the medical practice, the inner secretions of certain organs or glands, such as the thyroid glands and the suprarenal capsules, have been used for healing purposes. The processes usually employed for obtaining these secretions have hitherto consisted in making extracts from, or lixiviating the glands in question and then precipitating out all those albumins contained in the extracts, which are in a colloidal (sol) condition, by means of precipitating reagents such for instance as tannic acid. The precipitate thus obtained, which contains cellular and blood albumin, in addition to the inner secretions, was then purified and made up directly into tablet form. Thus these tablets contain albumins in addition to the inner secretions. For scientific as also for practical reasons it is, however, advantageous to obtain these inner secretions in physiologically pure solutions, the pure state of the material constituting the fundamental condition for the proper study and reliable employment of all substances.

The object of the present invention is to obtain such secretions in physiologically pure solutions.

I have found that the cellular and blood colloids possess entirely different qualities to those of the inner secretions, both as regards their capability of coagulating and their speed of penetrating semi-permeable or filtering walls or partitions. The cellular and blood colloids exhibit the properties of the typical colloids while the colloid of the inner secretion possesses qualities almost approaching those of the crystalloids. The present method of separating the products is based upon these different properties and the process consists in converting the blood and cellular colloids, by physical means quantitatively into the gel condition of the inner secretion. Thus it will be evident that the liquid obtained will be physiologically pure, because no soluble chemicals have been added, the partial gel condition being produced in the known manner by surface or catalytical reaction.

The invention may be carried out in a variety of ways, as hereinafter set forth.

First example: 1 kg. of fresh thyroid glands are filled into a receptacle of semipermeable material and subjected to the dialysis in a physiological solution of common salt. In the first place the cellular blood, and secretion colloids separate out altogether in the interior of the semipermeable receptacle. The colloid of the inner secretion passes quickly through the semipermeable walls of the receptacle, owing to its crystalloidal properties into the collecting receptacle, while the other colloids, owing to their purely colloidal nature are converted into the gel state or condition by the surface of catalytical reaction of the semipermeable walls and remain in the latter. The solution obtained is perfectly clear and of a yellow-brown to brown color having the same shade in penetrating and reflecting light. The latter phenomenon forms an important criterion for the purity of the product, since if by reason of defects in the semipermeable walls, some of the other colloids should get into the liquid the latter will show a whitish opalescence or white dullness in direct light.

In order to avoid the employment of an artificial semi-permeable wall, the surface of the gland employed may be rendered semi-permeable, so that a pure extract may be obtained, by placing the same directly in a liquid. This may may be effected, according to the nature of the gland, either by placing the same in boiling water for a moment or by rendering it air-dry. In both cases the surfaces of the same become semipermeable (owing to the coagulation of the cellular and blood colloids) and have the same effect as those of the intestine walls of the example first given.

Second example: An extract of a kilo of thyroid glands is heated in a water bath to 80° to 85° C. The extract is first placed in the cold bath and the latter then heated, the extract being covered up, and the level of the extract being the same as to level of the bath or somewhat below the same. On the first sign of the bath boiling, the extract must be removed. It is then allowed to cool slowly whereupon the cellular and blood albumin will quickly separate out in the form of flakes. The addition of heat in this case operates catalytically to accelerate the precipitation, since even a cold solution of the colloid mixture will soon begin to get dull or cloudy. This goes to prove that the process of precipitation in the form of flakes would take place, although but imperfectly, at ordinary temperatures in the course of a long time, but that it can be enormously accelerated and perfected by rapid heating.

Third example: The extract of a kilo of thyroid glands is mixed with a 0.1% tannic acid solution and shaken: the precipitation in the form of flakes takes place immediately and perfectly, the cellular and blood albumins alone being precipitated out owing to their greater inclination to coagulate. If more tannic acid were added the colloid of the inner secretion would be simultaneously separated out. In the present process the tannic acid operates catalytically and is, of course, precipitated out with the gels and does not remain in the solution.

I claim as my invention:—

A process for obtaining physiologically pure solutions of the inner secretions of organs according to which extracts of these organs in physiologic salt solution which contain a mixture of the colloids of the cellular, blood and secretion albumins are treated with means acting by catalysis and surface reaction only but not in producing chemical compounds with such albumins, by which treatment the typical colloids alone are caused to coagulate whereupon they are separated from the inner secretions which remain in solution.

In testimony whereof I affix my signature in the presence of two witnesses.

ERNST HOENNICKE.

Witnesses:
 RICHARD IPPERTE,
 ERNST LIENEMANN.